United States Patent
Bastioli et al.

(10) Patent No.: US 10,738,149 B2
(45) Date of Patent: Aug. 11, 2020

(54) COMPOSITIONS CONTAINING NEW POLYESTER

(71) Applicant: Novamont S.p.A., Novara (IT)

(72) Inventors: Catia Bastioli, Novara (IT); Luigi Capuzzi, Novara (IT); Tiziana Milizia, Novara (IT); Angelos Rallis, Novara (IT); Roberto Vallero, Borge D'Ale (IT)

(73) Assignee: NOVAMONT S.P.A., Novara (IT)

( * ) Notice: Subject to any disclaimer, the term of this patent is extended or adjusted under 35 U.S.C. 154(b) by 4 days.

(21) Appl. No.: 16/094,726

(22) PCT Filed: Apr. 20, 2017

(86) PCT No.: PCT/EP2017/059419
§ 371 (c)(1),
(2) Date: Oct. 18, 2018

(87) PCT Pub. No.: WO2017/182582
PCT Pub. Date: Oct. 26, 2017

(65) Prior Publication Data
US 2019/0119438 A1    Apr. 25, 2019

(30) Foreign Application Priority Data
Apr. 20, 2016 (IT) .......................... 102016000040946

(51) Int. Cl.
| C08K 3/013 | (2018.01) |
|---|---|
| C08G 63/181 | (2006.01) |
| C08G 63/16 | (2006.01) |
| C08L 97/02 | (2006.01) |
| B29C 45/00 | (2006.01) |
| C08G 63/199 | (2006.01) |
| C08G 63/52 | (2006.01) |
| C08L 67/02 | (2006.01) |
| C08L 99/00 | (2006.01) |
| C08L 101/00 | (2006.01) |
| C08J 5/04 | (2006.01) |
| C08J 5/18 | (2006.01) |
| C08K 7/02 | (2006.01) |
| B29K 67/00 | (2006.01) |
| C08K 5/00 | (2006.01) |

(52) U.S. Cl.
CPC ........ *C08G 63/181* (2013.01); *B29C 45/0001* (2013.01); *C08G 63/16* (2013.01); *C08G 63/199* (2013.01); *C08G 63/52* (2013.01); *C08J 5/045* (2013.01); *C08J 5/18* (2013.01); *C08K 3/013* (2018.01); *C08K 7/02* (2013.01); *C08L 67/02* (2013.01); *C08L 97/02* (2013.01); *C08L 99/00* (2013.01); *C08L 101/00* (2013.01); *B29K 2067/00* (2013.01); *C08G 2230/00* (2013.01); *C08J 2367/02* (2013.01); *C08K 5/0025* (2013.01); *C08L 2201/06* (2013.01); *C08L 2205/16* (2013.01)

(58) Field of Classification Search
USPC ................................. 525/437; 528/271, 272
See application file for complete search history.

(56) References Cited

U.S. PATENT DOCUMENTS

| 2013/0095263 A1 | 4/2013 | Carman, Jr. et al. |
| 2015/0001213 A1 | 1/2015 | Nederberg et al. |

FOREIGN PATENT DOCUMENTS

| CN | 103 570 925 A | 2/2014 |
| EP | 2 496 630 A1 | 9/2012 |
| WO | WO2011054926 A1 | 5/2011 |

OTHER PUBLICATIONS

Yu et al., "Chemosynthesis and Characterization of Fully Biomass-Based Copolymers of Ethylene Glycol, 2,5-Furandicarboxylic Acid, and Succinic Acid", J. Appl. Polym. Sci., vol. 130, No. 2, Oct. 15, 2013, pp. 1415.
XP002765188 English abstract for CN 103 570 925A Shanghai Genius Advanced Material Co.

*Primary Examiner* — Terressa Boykin
(74) *Attorney, Agent, or Firm* — Polsinelli PC

(57) ABSTRACT

Disclosed is a biodegradable compositions containing at least a polyester containing 2,5-furandicarboxylic acid and at least a polymer selected from the group consisting of polyhydroxyalkanoates and/or aliphatic and/or aliphatic-aromatic diacid diol polyesters, which is particularly suitable for use in the manufacture of mass-produced articles. The articles exhibit excellent mechanical properties, associated with a high barrier property against oxygen and carbon dioxide.

21 Claims, No Drawings

COMPOSITIONS CONTAINING NEW POLYESTER

CROSS REFERENCE TO RELATED APPLICATIONS

This application is a National Phase filing under 35 U.S.C. § 371 of PCT/EP2017/059419 filed on Apr. 20, 2017; and this application claims priority to application Ser. No. 10/201,6000040946 filed in Italy on Apr. 20, 2016. The entire contents of each application are hereby incorporated by reference.

This invention relates to biodegradable compositions containing at least a polyester containing 2,5-furandicarboxylic acid and at least a polymer selected from the group consisting of polyhydroxyalkanoates and/or aliphatic and/or aliphatic-aromatic diacid diol polyesters, characterised by substantial workability properties and characterised in that it is capable of being processed into products such as for example films, fibres, nonwoven fabrics, sheets, moulded, injection moulded, thermoformed, blow moulded and expanded articles characterised by excellent mechanical properties, associated with high barrier properties against oxygen and carbon dioxide.

Over the course of the years polymer materials have become increasingly widespread because of their versatility, the fact that they can be easily worked and their low cost.

For example, among thermoplastic polymer materials the development of new compositions containing polyesters has been of particular significance. Polymer materials of this type have in fact found substantial use in the field of fibres, moulded, injection moulded and blow moulded and film articles.

The increasing use of polymer materials in ever more technologically advanced fields of application does however require that new materials capable of ensuring increasingly high performance during use be continuously developed.

For example, in the sector of thermoplastic polyesters for the production of packaging film one of the greater difficulties is that of obtaining products characterised by a good balance between toughness and deformability properties and the ability to withstand high loads.

In the sector of moulded articles on the other hand one of the greatest difficulties is to ensure high productivity, minimising the tendency of the manufactured articles to deform for example during the stage of cooling in the mould (known as mould shrinkage).

The problem underlying this invention is therefore that of finding new biodegradable compositions containing at least a polyester containing 2,5-furandicarboxylic acid and at least a polymer selected from the group consisting of polyhydroxyalkanoates and/or aliphatic and/or aliphatic-aromatic diacid diol polyesters capable of ensuring high performance from the products obtained using it when in use, and in particular excellent workability and mechanical properties, together with a high barrier property against oxygen and carbon dioxide.

Starting from this problem it has now surprisingly been found that it is possible to obtain compositions having the characteristics mentioned above.

This invention relates to biodegradable compositions comprising, with respect to the sum of components i.-iv.:
  i) 20-60%, preferably 25-55%, more preferably 25-50% by weight of at least one biodegradable polyester;
  ii) 20-70%, preferably 25-65%, by weight of at least one biodegradable polymer which is not the polyester i., selected from the group consisting of polyhydroxyalkanoates and/or aliphatic and/or aliphatic-aromatic diacid diol polyesters which are not polyester i., and mixtures thereof;
  iii) 0-50%, preferably 3-45%, more preferably 5-40% by weight of at least one filler;
  iv) 0-30% by weight of plant fibres.

wherein the biodegradable aliphatic-aromatic polyester i. comprises:
  a) a dicarboxylic component comprising, with respect to the total dicarboxylic component:
    a1) 85-65% in moles, preferably 80-70% in moles, of units deriving from 2,5-furandicarboxylic acid or an ester thereof;
    a2) 15-35% in moles, preferably 20-30% in moles, of units deriving from at least one saturated dicarboxylic acid selected from the group consisting of adipic acid, azelaic acid, succinic acid, sebacic acid, brassylic acid or an ester or derivative thereof, preferably azelaic acid;
    a3) 0-15% in moles, preferably 0-10% in moles, of units deriving from at least one aliphatic saturated dicarboxylic acid which is not the saturated dicarboxylic acid in component a2 and is preferably selected from the group consisting of saturated $C_2$-$C_{24}$, preferably $C_4$-$C_{13}$, more preferably $C_4$-$C_{11}$, dicarboxylic acids, or esters thereof
    a4) 0-5% in moles, preferably 0.1-1% in moles, more preferably 0.2-0.7% in moles, of units deriving from at least one unsaturated aliphatic dicarboxylic acid or an ester thereof;
  b) a diol component comprising, with respect to the total diol component:
    b1) 95-100% in moles, of units deriving from 1,2-ethanediol;
    b2) 0-5% in moles, of units deriving from at least one saturated aliphatic diol which is not 1,2-ethanediol;
    b3) 0-5% in moles, preferably 0-3% in moles, of units deriving from at least one unsaturated aliphatic diol.

The saturated aliphatic dicarboxylic acids which are not the saturated dicarboxylic acid in component a2 (component a3 of the polyester i.) are preferably selected from saturated $C_2$-$C_{24}$, preferably $C_4$-$C_{13}$, more preferably $C_4$-$C_{11}$, dicarboxylic acids, their $C_1$-$C_{24}$, preferably $C_1$-$C_4$, alkyl esters, their salts and mixtures thereof. The unsaturated aliphatic dicarboxylic acids (component a4 of the polyester i.) are preferably selected from itaconic acid, fumaric acid, 4-methylene-pimelic acid, 3,4-bis (methylene) nonandioic acid, 5-methylene-nonandioic acid, their $C_1$-$C_{24}$, preferably $C_1$-$C_4$, alkyl esters, their salts and mixtures thereof. In a preferred embodiment of this invention the unsaturated aliphatic dicarboxylic acids comprise mixtures comprising at least 50% in moles, preferably more than 60% in moles, more preferably more than 65% in moles, of itaconic acid, its $C_1$-$C_{24}$, preferably $C_1$-$C_4$, esters. More preferably the unsaturated aliphatic dicarboxylic acids comprise itaconic acid.

As far as the saturated aliphatic diols which are not 1,2-ethanediol (component b2 of the polyester i.) are concerned, these are preferably selected from 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,4-cyclohexandimethanol, neopentylglycol, 2-methyl-1,3-propanediol, dianhydrosorbitol, dianhydromannitol, dianhydroiditol, cyclohexanediol, cyclohexanmethanediol, dialkylene glycols and polyalkylene glycols having a molecular weight of 100-4000, such as for example polyethylene glycol, polypropylene glycol and mixtures thereof. Preferably the diol component which is not 1,2-ethanediol comprises at least 50% in moles of one or more diols selected from 1,3-propanediol or 1,4-butanediol. More preferably the said diol component comprises or consists of 1,4-butanediol.

As far as the unsaturated aliphatic diols (component b3) of the polyester i. are concerned, these are preferably selected from cis 2-butene-1,4-diol, trans 2-butene-1,4-diol, 2-butyne-1,4-diol, cis 2-pentene-1,5-diol, trans 2-pentene-1, 5-diol, 2-pentyne-1,5-diol, cis 2-hexene-1,6-diol, trans 2-hexene-1,6-diol, 2-hexyne-1,6-diol, cis 3-hexene-1,6-diol, trans 3-hexene-1,6-diol, 3-hexyne-1,6-diol.

In addition to the dicarboxylic component and the diol component, the polyester i. of the compositions according to this invention preferably comprises repetitive units deriving from at least one hydroxy acid in a quantity of between 0-49%, preferably between 0-30%, in moles with respect to the total moles of the dicarboxylic component. Examples of convenient hydroxy acids are glycolic, hydroxybutyric, hydroxycaproic, hydroxyvaleric, 7-hydroxyheptanoic, 8-hydroxycaproic or 9-hydroxynonanoic acids, lactic acid or lactides. The hydroxy acids may be inserted into the chain as such or may also have previously been caused to react with diacids or diols.

Long molecules with two functional groups, including functional groups which are not in the terminal position, may also be present in quantities not exceeding 10% in moles with respect to the total moles of the dicarboxylic component. Examples are dimer acids, ricinoleic acid and acids incorporating epoxy groups including polyoxyethylenes having molecular weights of between 200 and 10000.

Diamines, amino acids, and amino alcohols may also be present in percentages up to 30% in moles with respect to the total moles of the dicarboxylic component.

In the course of preparation of the polyester i. of the compositions according to this invention one or more molecules with multiple functional groups may also advantageously be added in quantities of between 0.1 and 3% in moles with respect to the total moles of the dicarboxylic component (including any hydroxy acids) in order to obtain branched products. Examples of these molecules are glycerol, pentaerythritol, trimethylolpropane, citric acid, dipentaerythritol, acid triglycerides, polyglycerols.

The molecular weight Mn of the polyester i. of the compositions according to this invention is preferably ≥20000, more preferably ≥40000. As far as the polydispersity index of the molecular weights, Mw/Mn, is concerned, this is instead preferably between 1.5 and 10, more preferably between 1.6 and 5 and even more preferably between 1.8 and 2.7.

Molecular weights Mn and Mw may be measured by gel permeation chromatography (GPC).

The determination may be carried out with the chromatography system held at 40° C., using a set of three columns in series (particle diameter of 5 μm and porosities of 500 Å units, 10000 Å units and 100000 Å units respectively), a refractive index detector, hexafluoroisopropanol (HFIP) as eluent (flow 1 ml/min), using poly(methyl methacrylate) as the reference standard. Preferably the polyester i. of the compositions according to this invention has an inherent viscosity of more than 0.3 dl/g, preferably between 0.3 and 2 dl/g, more preferably between 0.4 and 1.2 dl/g (measured using an Ubbelohde viscometer in 1:1 v/v dichloromethane-trifluoroacetic acid solution at a concentration of 0.5 g/dl at 25° C.).

The polyester i. has glass transition temperature ($T_g$) of between 5° C. and 60° C., measured by means of Differential Scanning Calorimetry.

The polyester i. of the compositions according to this invention is biodegradable. In the meaning of this invention by biodegradable polyesters are meant biodegradable polyesters according to standard EN 13432.

The polyester i. of the compositions according to this invention may be synthesised according to any one of the processes known in the state of the art. In particular they may be advantageously obtained by means of a polycondensation reaction.

Advantageously the process of synthesis may be carried out in the presence of a suitable catalyst. By way of suitable catalysts mention may be made by way of example of organometallic compounds of tin, for example stannoic acid derivatives, titanium compounds, for example orthobutyl titanate, aluminium compounds, for example triisopropyl Al, compounds of antimony, zinc and zirconium, and mixtures thereof.

As far as the biodegradable polymers which are not the polyester i. (component ii.) are concerned, these are selected from the group consisting of polyhydroxyalkanoates and/or aliphatic and/or aliphatic-aromatic diacid diol polyesters which are not polyester i., and mixtures thereof.

As far as the polyhydroxyalkanoates are concerned, these are preferably selected from the group consisting of lactic acid polyesters, poly-ε-caprolactone, polyhydroxybutyrate, polyhydroxybutyrate-valerate, polyhydroxybutyrate-propanoate, polyhydroxybutyrate-hexanoate, polyhydroxybutyrate-decanoate, polyhydroxybutyrate-dodecanoate, polyhydroxybutyrate-hexadecanoate, polyhydroxybutyrate-octadecanoate, poly-3-hydroxybutyrate-4-hydroxybutyrate. Preferably the polyhydroxyalkanoate in the composition comprises at least 80% by weight of one or more polyesters of lactic acid. In a preferred embodiment the said lactic acid polyesters are selected from the group consisting of poly-L-lactic acid, poly-D-lactic acid, the poly-D-L-lactic stereo complex, copolymers comprising more than 50% in moles of the said lactic acid polyesters or mixtures thereof. Particularly preferred are lactic acid polyesters containing at least 95% by weight of repetitive units deriving from L-lactic or D-lactic acids or combinations thereof having a molecular weight Mw of more than 50000 and a shear viscosity of between 50 and 500 Pa·s, preferably between 100 and 300 Pa·s (measured according to ASTM standard D3835 at T=190° C., shear rate=1000 $s^{-1}$, D=1 mm, L/D=10).

In a particularly preferred embodiment of the invention the lactic acid polyester comprises at least 95% by weight of units deriving from L-lactic acid, ≤5% of repetitive units deriving from D-lactic acid, has a melting point in the range 135-170° C., a glass transition temperature (Tg) in the range 55-65° C. and an MFR in the range 1-50 g/10 min (measured in accordance with standard ISO 1133-1 at 190° C. and 2.16 kg). Commercial examples of lactic acid polyesters having these properties are for example the products of the Ingeo™ Biopolymer 4043D, 3251D and 6202D make.

As far as the diacid diol polyesters (component ii.) which are not polyester i. are concerned, these are preferably selected from the group consisting of polyesters comprising:
 a) a dicarboxylic component comprising with respect to the total for the dicarboxylic component:
  a11) 0-40%, preferably 0-20%, in moles of one or more aromatic diacids, their esters or salts;
  a12) 60-100%, preferably 80-100%, in moles of one or more aliphatic diacids, their esters or salts;

or
- a21) 40-95%, preferably 45-80%, in moles of one or more aromatic diacids, their esters or salts;
- a22) 5-60%, preferably 20-55%, in moles of one or more aliphatic diacids, their esters or salts;
- b) a diol component comprising derivative units with respect to the total for the diol component:
  - b1) 95-100% in moles of units deriving from at least one saturated aliphatic diol;
  - b2) 0-5% in moles of units deriving from at least one unsaturated aliphatic diol.

Preferably the aromatic dicarboxylic acids, saturated aliphatic dicarboxylic acids, unsaturated aliphatic dicarboxylic acids, saturated aliphatic diols and unsaturated aliphatic diols for the said polyesters are selected from those described above for the polyester according to this invention (component i.). More preferably the said diacid-diol polyesters which are not polyester i. are selected from the group consisting of block or random copolymers of the poly(alkylene alkylate), poly(alkylene terephthalate-co-alkylene alkylate) or poly(alkylene 2,5-furandicarboxylate-co-alkylene alkylate) type. Preferred examples of diacid diol polyesters which are not polyester i. are selected from the group consisting of: poly(1,4-butylene succinate), poly(1,2-ethylene succinate), poly(1,4-butylene adipate), poly(1,2-ethylene adipate), poly(1,4-butylene azelate), poly(1,2-ethylene azelate), poly(1,4-butylene sebacate), poly(1,2-ethylene sebacate), poly(1,2-ethylene succinate-co-1,4-butylene succinate), poly(1,2-ethylene adipate-co-1,4-butylene adipate), poly(1,2-ethylene azelate-co-1,4-butylene azelate), poly(1,2-ethylene sebacate-co-1,4-butylene sebacate), poly(1,2-ethylene succinate-co-1,4-butylene adipate), poly(1,2-ethylene succinate-co-1,4-butylene azelate), poly(1,2-ethylene succinate-co-1,4-butylene sebacate), poly(1,2-ethylene adipate-co-1,4-butylene succinate), poly(1,2-ethylene adipate-co-1,4-butylene azelate), poly(1,2-ethylene adipate-co-1,4-butylene sebacate), poly(1,2-ethylene azelate-co-1,4-butylene succinate), poly(1,2-ethylene azelate-co-1,4-butylene adipate), poly(1,2-ethylene azelate-co-1,4-butylene sebacate), poly(1,2-ethylene sebacate-co-1,4-butylene succinate), poly(1,2-ethylene sebacate-co-1,4-butylene adipate), poly(1,2-ethylene sebacate-co-1,4-butylene azelate), poly(1,4-butylene adipate-co-1,4-butylene succinate), poly(1,4-butylene azelate-co-1,4-butylene succinate), poly(1,4-butylene sebacate-co-1,4-butylene succinate), poly(1,4-butylene succinate-co-1,4-butylene adipate-co-1,4-butylene azelate), poly(1,4-butylene adipate-co-1,4-butylene terephthalate), poly(1,4-butylene sebacate-co-1,4-butylene terephthalate), poly(1,4-butylene azelate-co-1,4-butylene terephthalate), poly(1,4-butylene brassylate-co-1,4-butylene terephthalate), poly(1,4-butylene succinate-co-1,4-butylene terephthalate), poly(1,4-butylene adipate-co-1,4-butylene sebacate-co-1,4-butylene terephthalate), poly(1,4-butylene azelate-co-1,4-butylene sebacate-co-1,4-butylene terephthalate), poly(1,4-butylene adipate-co-1,4-butylene azelate-co-1,4-butylene terephthalate), poly(1,4-butylene succinate-co-1,4-butylene sebacate-co-1,4-butylene terephthalate), poly(1,4-butylene adipate-co-1,4-butylene succinate-co-1,4-butylene terephthalate), poly(1,4-butylene azelate-co-1,4-butylene succinate-co-1,4-butylene terephthalate), poly(1,4-butylene adipate-co-1,4-butylene 2,5-furandicarboxylate), poly(1,4-butylene sebacate-co-1,4-butylene 2,5-furandicarboxylate), poly(1,4-butylene azelate-co-1,4-butylene 2,5-furandicarboxylate), poly(1,4-butylene brassylate-co-1,4-butylene 2,5-furandicarboxylate), poly(1,4-butylene succinate-co-1,4-butylene 2,5-furandicarboxylate), poly(1,4-butylene adipate-co-1,4-butylene sebacate-co-1,4-butylene 2,5-furandicarboxylate), poly(1,4-butylene azelate-co-1,4-butylene sebacate-co-1,4-butylene 2,5-furandicarboxylate), poly(1,4-butylene adipate-co-1,4-butylene azelate-co-1,4-butylene 2,5-furandicarboxylate), poly(1,4-butylene succinate-co-1,4-butylene sebacate-co-1,4-butylene 2,5-furandicarboxylate), poly(1,4-butylene adipate-co-1,4-butylene succinate-co-1,4-butylene 2,5-furandicarboxylate), poly(1,4-butylene azelate-co-1,4-butylene succinate-co-1,4-butylene 2,5-furandicarboxylate), poly(1,2-ethylene adipate-co-1,2-ethylene 2,5-furandicarboxylate), poly(1,2-ethylene sebacate-co-1,2-ethylene 2,5-furandicarboxylate), poly(1,2-ethylene azelate-co-1,2-ethylene 2,5-furandicarboxylate), poly(1,2-ethylene brassylate-co-1,2-ethylene 2,5-furandicarboxylate), poly(1,2-ethylene succinate-co-1,2-ethylene 2,5-furandicarboxylate), poly(1,2-ethylene adipate-co-1,2-ethylene sebacate-co-1,2-ethylene 2,5-furandicarboxylate), poly(1,2-ethylene azelate-co-1,2-ethylene sebacate-co-1,2-ethylene 2,5-furandicarboxylate), poly(1,2-ethylene adipate-co-1,2-ethylene azelate-co-1,2-ethylene 2,5-furandicarboxylate), poly(1,2-ethylene succinate-co-1,2-ethylene sebacate-co-1,2-ethylene 2,5-furandicarboxylate), poly(1,2-ethylene adipate-co-1,2-ethylene succinate-co-1,2-ethylene 2,5-furandicarboxylate), poly(1,2-ethylene azelate-co-1,2-ethylene succinate-co-1,2-ethylene 2,5-furandicarboxylate), their copolymers and mixtures.

In a further preferred embodiment of this invention, the said diacid-diol polyesters which are not polyester i. are selected from the group consisting of:

(A) polyesters comprising repetitive units deriving from aromatic dicarboxylic acids of the phthalic acid type, preferably terephthalic acid, aliphatic dicarboxylic acids and aliphatic diols (AAPE-A) characterised by an aromatic units content of between 35 and 60% in moles, preferably between 40 and 55% in moles with respect to the total moles of the dicarboxylic component. AAPE-A polyesters are preferably selected from: poly(1,4-butylene adipate-co-1,4-butylene terephthalate), poly(1,4-butylene sebacate-co-1,4-butylene terephthalate), poly(1,4-butylene azelate-co-1,4-butylene terephthalate), poly(1,4-butylene brassylate-co-1,4-butylene terephthalate), poly(1,4-butylene succinate-co-1,4-butylene terephthalate), poly(1,4-butylene adipate-co-1,4-butylene sebacate-co-1,4-butylene terephthalate), poly(1,4-butylene azelate-co-1,4-butylene sebacate-co-1,4-butylene terephthalate), poly(1,4-butylene adipate-co-1,4-butylene azelate-co-1,4-butylene terephthalate), poly(1,4-butylene succinate-co-1,4-butylene sebacate-co-1,4-butylene terephthalate), poly(1,4-butylene adipate-co-1,4-butylene succinate-co-1,4-butylene terephthalate), poly(1,4-butylene azelate-co-1,4-butylene succinate-co-1,4-butylene terephthalate).

(B) polyesters comprising repetitive units deriving from heterocyclic dicarboxylic aromatic compounds, preferably 2,5-furandicarboxylic acid, aliphatic dicarboxylic acids and aliphatic diols (AAPE-B) characterised by an aromatic units content of between 50 and 80% in moles, preferably between 60 and 75% in moles, with respect to the total moles of the dicarboxylic component. AAPE-B polyesters are preferably selected from: poly(1,4-butylene adipate-co-1,4-butylene 2,5-furandicarboxylate), poly(1,4-butylene sebacate-co-1,4-butylene 2,5-furandicarboxylate), poly(1,4-butylene azelate-co-1,4-butylene 2,5-furandicarboxylate), poly(1,4-butylene brassylate-co-1,4-butylene 2,5-furandicarboxylate), poly(1,4-butylene succinate-co-1,4-butylene 2,5-furandicarboxylate), poly(1,4-butylene adipate-co-1,4-butylene sebacate-co-1,4-butylene 2,5-furandicarboxylate), poly(1,4-butylene azelate-co-1,4-butylene sebacate-co-1,4-butylene 2,5-furandicarboxylate), poly(1,4-butylene adipate-co-1,4-butylene azelate-co-1,4-butylene 2,5-furandicarboxylate), poly(1,4-butylene succinate-co-1,4-butylene sebacate-co-1,4-butylene 2,5-furandicarboxylate), poly(1,4-butylene adipate-co-1,4-butylene succinate-co-1,4-butylene 2,5-furandicarboxylate), poly(1,4-butylene azelate-co-1,4-butylene succinate-co-1,4-butylene 2,5-furandicarboxylate).

In a further preferred embodiment of this invention, the said diacid-diol polyesters which are not polyester i. are selected from the group consisting of: poly(1,4-butylene succinate), poly(1,4-butylene sebacate), poly(1,2-ethylene sebacate), poly(1,4-butylene adipate-co-1,4 butylene sebacate-co-1,4-butylene terephthalate), poly(1,4-butylene adipate-co-1,4 butylene azelate-co-1,4-butylene terephthalate), poly(1,4-butylene sebacate-co-1,4-butylene terephthalate), poly(1,4-butylene azelate-co-1,4-butylene terephthalate), poly(1,4-butylene adipate-co-1,4-butylene terephthalate).

In an even more preferred embodiment of this invention, the said diacid diol polyesters which are not polyester i. are selected from the group consisting of: poly(1,4-butylene succinate), poly(1,4-butylene adipate-co-1,4-butylene terephthalate).

The polymers ii. of the compositions according to this invention are biodegradable. In the meaning of this invention by biodegradable polymers are meant biodegradable polymers according to standard EN 13432.

In the compositions according to this invention the filler (component iii.) helps to improve dimensional stability and is preferably selected from kaolin, barytes, clay, talc, calcium and magnesium, iron and lead carbonates, aluminium hydroxide, diatomaceous earth, aluminium sulfate, barium sulfate, silica, mica, titanium dioxide, wollastonite, starch, chitin, chitosan, alginates, proteins such as gluten, zein, casein, collagen, gelatin, natural gums, rosinic acids and their derivatives.

By the term starch is here meant all types of starch, that is: flour, native starch, hydrolysed starch, destructured starch, gelatinised starch, plasticised starch, thermoplastic starch, biofillers comprising complexed starch or mixtures thereof. Particularly suitable according to the invention are starches such as potato, maize, tapioca and pea starch.

Starches which can be easily destructured and which have high initial molecular weights, such as for example potato or maize starch, have proved to be particularly advantageous.

The starch may be present as such or in a chemically modified form, such as for example in the form of starch esters with a degree of substitution of between 0.2 and 2.5, hydroxypropylate starch, or starch modified with fatty chains.

By destructured starch reference is made here to the teaching included in Patents EP-0 118 240 and EP-0 327 505, such starch meaning starch which has been processed so as to be substantially free of the so-called "Maltese crosses" under an optical microscope in polarised light and the so-called "ghosts" under a phase contrast optical microscope.

Advantageously the starch is destructured by means of an extrusion process at temperatures between 110 and 250° C., preferably 130-180° C., pressures preferably between 0.1 and 7 MPa, preferably 0.3-6 MPa, preferably providing a specific energy of more than 0.1 kWh/kg during the said extrusion.

The starch is preferably destructured in the presence of 1-40% by weight with respect to the weight of the starch of one or more plasticisers selected from water and polyols having from 2 to 22 carbon atoms. As far as the water is concerned, this may also be that naturally present in the starch. Among the polyols, those preferred are polyols having from 1 to 20 hydroxyl groups containing from 2 to 6 carbon atoms, their ethers, thioethers and organic and inorganic esters. Examples of polyols are glycerine, diglycerol, polyglycerol, pentaerythritol, polyglycerol ethoxylate, ethylene glycol, polyethylene glycol, 1,2-propanediol, 1,3-propanediol, 1,4-butanediol, neopentyl glycol, sorbitol monoacetate, sorbitol diacetate, sorbitol monoethoxylate, sorbitol diethoxylate, and mixtures thereof. In a preferred embodiment the starch is destructured in the presence of glycerol or a mixture of plasticisers comprising glycerol, more preferably containing between 2 and 90% by weight of glycerol. Preferably the destructured and cross-linked starch according to this invention comprises between 1 and 40% by weight of plasticisers with respect to the weight of the starch.

When present the starch in the composition is preferably in the form of particles having a circular or elliptical cross-section or a cross-section which can in any event be likened to an ellipse having an arithmetic mean diameter of less than 1 micron and preferably less than 0.5 μm mean diameter, measured taking the major axis of the particle into consideration.

In a preferred embodiment of this invention the filler comprises talc, calcium carbonate or mixtures thereof, present in the form of particles having a mean arithmetic diameter of less than 10 microns, measured taking the major axis of the particles into consideration. It has in fact been discovered that fillers of the abovementioned type not characterised by the said mean arithmetic diameter improve significantly less the disintegratability characteristics, during industrial composting, of the moulded objects comprising them. Without wishing to be bound to any specific theory, it is felt that when used in the compositions according to the invention, the said fillers become stratified and agglomerate during the moulding stage, thus slowing down the action of the agents responsible for disintegration of the moulded articles. In the composition according to this invention the plant fibres (component iv.) are preferably selected from cellulose fibres, wood flour, cannabis fibres, lignocellulose residues originating from raw materials of plant origin, such as for example thistle and sunflower plants, and grass cuttings. The compositions according to this invention preferably comprises up to 30% by weight of plant fibre (component iv.). It has in fact been found that such a content has the effect of significantly improving the disintegratability characteristics of the polymer composition, while at the same time making it possible to manufacture articles having a high heat deflection temperature under load and particularly high dimensional stability, thus making it possible to prepare compositions which are also devoid of fillers.

In a preferred embodiment the composition according to this invention comprises from 5 to 25% by weight of plant fibre. In particular this plant fibre content is particularly suitable for use in the composition according to this invention in injection moulding techniques.

By "dimensional stability" is meant the ability of an object to maintain its original shape over time and following annealing treatment.

It has also unexpectedly been found that the use of plant fibres having a length/diameter (i.e. L/D) ratio <40, preferably L/D<30 and even more preferably L/D<20, has proved to be particularly advantageous, because in addition to contributing to the abovementioned dimensional stability and high heat deflection temperature properties it does not give rise to excessive increases in tensile modulus or significant decreases in deformation of the polymer composition on failure, or an appreciable reduction in its flowability in the molten state.

Particularly preferred examples of compositions according to this invention are:

Compositions A, comprising, with respect to the sum of components i.-iv.:
- i) 20-60%, preferably 25-55%, more preferably 25-50% by weight of at least one biodegradable polyester i.;
- ii) 20-70%, preferably 25-65%, by weight of at least one polyhydroxyalkanoate; iii) 0-50%, preferably 3-45%, more preferably 5-40% by weight of at least one filler;
- iv) 0-30% by weight of plant fibres.

Compositions B, comprising, with respect to the sum of components i.-iv.:
- i) 20-60%, preferably 25-55%, more preferably 25-50% by weight of at least one biodegradable polyester i.;
- ii) 20-70%, preferably 25-65%, by weight of at least one aliphatic diacid diol polyester;
- iii) 0-50%, preferably 3-45%, more preferably 5-40% by weight of at least one filler;
- iv) 0-30% by weight of plant fibres.

Compositions C, comprising, with respect to the sum of components i.-iv.:
- i) 20-60%, preferably 25-55%, more preferably 25-50% by weight of at least one biodegradable polyester i.;
- ii) 20-70%, preferably 25-65%, by weight of at least one aliphatic-aromatic diacid diol polyester;
- iii) 0-50%, preferably 3-45%, more preferably 5-40% by weight of at least one filler;
- iv) 0-30% by weight of plant fibres.

Compositions D, comprising, with respect to the sum of components i.-iii.:
- i) 20-60%, preferably 25-55%, more preferably 25-50% by weight of at least one biodegradable polyester i.;
- ii) 20-70%, preferably 25-65%, by weight of at least one polyhydroxyalkanoate;
- iii) 3-45%, more preferably 5-40% by weight of at least one filler.

Compositions E, comprising, with respect to the sum of components i.-iii.:
- i) 20-60%, preferably 25-55%, more preferably 25-50% by weight of at least one biodegradable polyester i.;
- ii) 20-70%, preferably 25-65%, by weight of at least one aliphatic diacid diol polyester;
- iii) 3-45%, more preferably 5-40% by weight of at least one filler.

Compositions F, comprising, with respect to the sum of components i.-iii.:
- i) 20-60%, preferably 25-55%, more preferably 25-50% by weight of at least one biodegradable polyester i.;
- ii) 20-70%, preferably 25-65%, by weight of at least one aliphatic-aromatic diacid diol polyester;
- iii) 3-45%, more preferably 5-40% by weight of at least one filler.

Compositions G, comprising, with respect to the sum of components i.-iv.:
- i) 25-50% by weight of at least one biodegradable polyester i.;
- ii) 25-65%, by weight of at least one polyhydroxyalkanoate;
- iii) 0-50%, preferably 3-45%, more preferably 5-40% by weight of at least one filler;
- iv) 0-30% by weight of plant fibres.

Compositions H, comprising, with respect to the sum of components i.-iv.:
- i) 25-50% by weight of at least one biodegradable polyester i.;
- ii) 25-65%, by weight of at least one aliphatic diacid diol polyester;
- iii) 0-50%, preferably 3-45%, more preferably 5-40% by weight of at least one filler;
- iv) 0-30% by weight of plant fibres.

Compositions I, comprising, with respect to the sum of components i.-iv.:
- i) 25-50% by weight of at least one biodegradable polyester i.;
- ii) 25-65%, by weight of at least one aliphatic-aromatic diacid diol polyester;
- iii) 0-50%, preferably 3-45%, more preferably 5-40% by weight of at least one filler;
- iv) 0-30% by weight of plant fibres.

In addition to the components i.-iv. the compositions according to this invention may also comprise up to 5% by weight with respect to total weight of the composition of a cross-linking agent and/or chain extender. The cross-linking agent and/or chain extender improves stability to hydrolysis and is selected from compounds having two and/or multiple functional groups including isocyanate, peroxide, carbodiimide, isocyanurate, oxazoline, epoxide, anhydride or divinyl ether groups and mixtures thereof. Preferably the cross-linking agent and/or chain extender comprises at least one compound containing two and/or multiple functional groups including isocyanate groups. More preferably the cross-linking agent and/or chain extender comprises at least 25% by weight of one or more compounds having two and/or multiple functional groups including isocyanate groups. Particularly preferred are mixtures of compounds having two and/or multiple functional groups including isocyanate groups with compounds having two and/or multiple functional groups including epoxide groups, even more preferably comprising at least 75% by weight of compounds having two and/or multiple functional groups including isocyanate groups.

The compounds with two and multiple functional groups including isocyanate groups are preferably selected from p-phenylene diisocyanate, 2,4-toluene diisocyanate, 2,6-toluene diisocyanate, 4,4-diphenylmethane-diisocyanate, 1,3-phenylene-4-chloro diisocyanate, 1,5-naphthalene diisocyanate, 4,4-diphenylene diisocyanate, 3,3'-dimethyl-4,4-diphenylmethane diisocyanate, 3-methyl-4,4'-diphenylmethane diisocyanate, diphenylester diisocyanate, 2,4-cyclohexane diisocyanate, 2,3-cyclohexane diisocyanate, 1-methyl 2,4-cyclohexyl diisocyanate, 1-methyl 2,6-cyclohexyl diisocyanate, bis-(isocyanate cyclohexyl) methane, 2,4,6-toluene triisocyanate, 2,4,4-diphenylether triisocyanate, polymethylene-polyphenyl-polyisocyanates, methylene diphenyl diisocyanate, triphenylmethane triisocyanate, 3,3'-ditolylene-4,4-diisocyanate, 4,4'-methylene bis (2-methyl-phenyl isocyanate), hexamethylene diisocyanate, 1,3-cyclohexylene diisocyanate, 1,2-cyclohexylene diisocyanate and their mixtures. In a preferred embodiment the compound including isocyanate groups is 4,4-diphenylmethane-diisocyanate.

As far as the compounds with two and multiple functional groups incorporating peroxide groups are concerned, these are preferably selected from benzoyl peroxide, lauroyl peroxide, isononanoyl peroxide, di-(t-butylperoxyisopropyl) benzene, t-butyl peroxide, dicumyl peroxide, alpha,alpha'-di(t-butylperoxy) diisopropyl benzene, 2,5-dimethyl-2,5di (t-butylperoxy) hexane, t-butyl cumyl peroxide, di-t-butylperoxide, 2,5-dimethyl-2,5-di(t-butylperoxy) hex-3-yne, di(4-t-butylcyclohexyl) peroxydicarbonate, dicetyl peroxydicarbonate, dimyristyl peroxydicarbonate, 3,6,9-triethyl-3,6,9-trimethyl-1,4,7-triperoxonane, di(2-ethylhexyl) peroxydicarbonate and their mixtures.

The compounds with two and multiple functional groups including carbodiimide groups which are preferably used in the composition according to this invention are selected from poly(cyclooctylene carbodiimide), poly(1,4-dimethylenecyclohexylene carbodiimide), poly(cyclohexylene carbodiimide), poly(ethylene carbodiimide), poly(butylene carbodiimide), poly(isobutylene carbodiimide), poly(nonylene carbodiimide), poly(dodecylene carbodiimide), poly(neopentylene carbodiimide), poly(1,4-dimethylene phenylene carbodiimide), poly(2,2',6,6'-tetra isopropyl diphenylene carbodiimide) (Stabaxol® D), poly(2,4,6-triisopropyl-1,3-phenylene carbodiimide) (Stabaxol® P-100), poly(2,6 diisopropyl-1,3-phenylene carbodiimide) (Stabaxol® P), poly (tolyl carbodiimide), poly(4,4'-diphenyl methane carbodiimide), poly(3,3'-dimethyl-4,4'-biphenylene carbodiimide), poly(p-phenylene carbodiimide), poly(m-phenylene carbodiimide), poly(3,3'-dimethyl-4,4'-diphenyl methane carbodiimide), poly(naphthalene carbodiimide), poly(isophorone carbodiimide), poly(cumene carbodiimide), p-phenylene bis (ethyl carbodiimide), 1,6-hexamethylene bis(ethylcarbodiimide), 1,8-octamethylene bis(ethylcarbodiimide), 1,10-decamethylene bis(ethylcarbodiimide), 1,12 dodecamethylene bis(ethylcarbodiimide) and their mixtures. Examples of compounds with two and multiple functional groups including epoxide groups which can advantageously be used in the composition according to this invention are all the polyepoxides from epoxylated oils and/or styrene-glycidyl ether-methyl methacrylate, glycidyl ether methyl methacrylate, included in a range of molecular weights from 1000 to 10000 and having an epoxide number per molecule in the range from 1 to 30 and preferably from 5 to 25, and epoxides selected from the group comprising: diethylene glycol diglycidyl ether, polyethylene glycol diglycidyl ether, glycerol polyglycidyl ether, diglycerol polyglycidyl ether, 1,2-epoxybutane, polyglycerol polyglycidyl ether, isoprene diepoxide, and cycloaliphatic diepoxides, 1,4-cyclohexandimethanol diglycidyl ether, glycidyl 2-methylphenyl ether, glycerol propoxylatotriglycidyl ether, 1,4-butanediol diglycidyl ether, sorbitol polyglycidyl ether, glycerol diglycidyl ether, meta-xylene diamine tetraglycidyl ether and bisphenol A diglycidyl ether and their mixtures.

Catalysts may also be used together with the compounds with two and multiple functional groups including isocyanate, peroxide, carbodiimide, isocyanurate, oxazoline, epoxide, anhydride and divinyl ether groups in the composition according to this invention to increase the reactivity of the reactive groups. Salts of fatty acids, even more preferably calcium and zinc stearates, are preferably used in the case of polyepoxides.

In a particularly preferred embodiment of the invention the cross-linking agent and/or chain extender in the composition comprises compounds including isocyanate groups, preferably 4,4-diphenylmethane-diisocyanate, and/or including carbodiimide groups, and/or including epoxide groups, preferably of the styrene-glycidylether-methylmethacrylate type.

In addition to the components i.-iv. the compositions according to this invention may also comprise up to 15%, preferably up to 10%, more preferably up to 5% by weight with respect to the total weight of the composition of a polymer which is not biodegradable.

The polymer which is not biodegradable is advantageously selected from the group consisting of vinyl polymers, diacid diol polyesters which are not polyester i. or ii., polyamides, polyurethanes, polyethers, polyureas, polycarbonates and mixtures thereof.

Of the vinyl polymers, those preferred are: polyethylene, polypropylene, their copolymers, polyvinyl alcohol, polyvinyl acetate, polyethylvinyl acetate and polyethylenevinyl alcohol, polystyrene, chlorinated vinyl polymers, polyacrylates.

Among the chlorinated vinyl polymers, those that are to be understood to be included here are, apart from polyvinyl chloride, polyvinylidene chloride, polyethylene chloride, poly(vinyl chloride-vinyl acetate), poly(vinyl chloride-ethylene), poly(vinyl chloride-propylene), poly(vinyl chloride-styrene), poly(vinyl chloride-isobutylene) and copolymers in which polyvinyl chloride represents more than 50% in moles. The said copolymers may be random, block or alternating copolymers.

As far as the diacid diol polyesters which are not polyester i. or ii. are concerned, these are preferably selected from the group consisting of polyesters comprising:
  a) a dicarboxylic component comprising with respect to the total for the dicarboxylic component:
    a11) 50-100% in moles, preferably 60-100% in moles of one or more aromatic diacids, their esters or salts;
    a12) 0-50% in moles, preferably 0-40% in moles of one or more aliphatic diacids, their esters or salts;
  b) a diol component comprising derivative units with respect to the total for the diol component:
    b1) 95-100% in moles of units deriving from at least one saturated aliphatic diol;
    b2) 0-5% in moles of units deriving from at least one unsaturated aliphatic diol.

Preferably the aromatic dicarboxylic acids, saturated aliphatic dicarboxylic acids, unsaturated aliphatic dicarboxylic acids, saturated aliphatic diols and unsaturated aliphatic diols for the said polyesters are selected from those described above for the polyester according to this invention (component i. and ii.). More preferably the said diacid diol polyesters which are not polyester i. and ii. are selected from the group consisting of poly(ethylene terephthalate), poly(propylene terephthalate), poly(butylene terephthalate), poly(ethylene 2,5-furandicarboxylate), poly(propylene 2,5-furandicarboxylate), poly(butylene 2,5-furandicarboxylate) and block or random copolymers of the poly(alkylene 2,5-furandicarboxylate-co-alkylene terephthalate), poly (alkylene terephthalate-co-alkylene alkylate) or poly(alkylene 2,5-furandicarboxylate-co-alkylene alkylate) type. Preferred examples of diacid diol polyesters which are not polyester i. and ii. are selected from the group consisting of: poly(1,4-butylene adipate-co-1,4-butylene terephthalate), poly(1,4-butylene sebacate-co-1,4-butylene terephthalate), poly(1,4-butylene azelate-co-1,4-butylene terephthalate), poly(1,4-butylene brassylate-co-1,4-butylene terephthalate), poly(1,4-butylene succinate-co-1,4-butylene terephthalate), poly(1,4-butylene adipate-co-1,4-butylene sebacate-co-1,4-butylene terephthalate), poly(1,4-butylene azelate-co-1,4-butylene sebacate-co-1,4-butylene terephthalate), poly(1,4-butylene adipate-co-1,4-butylene azelate-co-1,4-butylene terephthalate), poly(1,4-butylene succinate-co-1,4-butylene sebacate-co-1,4-butylene terephthalate), poly(1,4-butylene adipate-co-1,4-butylene succinate-co-1,4-butylene terephthalate), poly(1,4-butylene azelate-co-1,4-butylene succinate-co-1,4-butylene terephthalate), poly(1,4-butylene adipate-co-1,4-butylene 2,5-furandicarboxylate), poly(1,4-butylene sebacate-co-1,4-butylene 2,5-furandicarboxylate), poly(1,4-butylene azelate-co-1,4-butylene 2,5-furandicarboxylate), poly(1,4-butylene brassylate-co-1,4-butylene 2,5-furandicarboxylate), poly(1,4-butylene succinate-co-1,4-butylene 2,5-furandicarboxylate), poly(1,4-butylene adipate-co-1,4-butylene sebacate-co-1,4-butylene 2,5-furandicarboxylate), poly(1,4-butylene azelate-co-1,4-butylene sebacate-co-1,4-butylene 2,5-furandicarboxylate), poly(1,4-butylene adipate-co-1,4-butylene azelate-co-1,4-butylene 2,5-furandicarboxylate), poly(1,4-butylene succinate-co-1,4-butylene sebacate-co-1,4-butylene 2,5-furandicarboxylate), poly(1,4-butylene adipate-co-1,4-butylene succinate-co-1,4-butylene 2,5-furandicarboxylate), poly(1,4-butylene azelate-co-1,4-butylene succinate-co-1,4-butylene 2,5-furandicarboxylate), poly(1,2-ethylene adipate-co-1,2-ethylene 2,5-furandicarboxylate), poly(1,2-ethylene sebacate-co-1,2-ethylene 2,5-furandicarboxylate), poly(1,2-ethylene azelate-co-1,2-ethylene 2,5-furandicarboxylate), poly(1,2-ethylene brassylate-co-1,2-ethylene 2,5-furandicarboxylate), poly(1,2-ethylene succinate-co-1,2-ethylene 2,5-furandicarboxylate), poly(1,2-ethylene adipate-co-1,2-ethylene sebacate-co-1,2-ethylene 2,5-furandicarboxylate), poly(1,2-ethylene azelate-co-1,2-ethylene sebacate-co-1,2-ethylene 2,5-furandicarboxylate), poly(1,2-ethylene adipate-co-1,2-ethylene azelate-co-1,2-ethylene 2,5-furandicarboxylate), poly(1,2-ethylene succinate-co-1,2-ethylene sebacate-co-1,2-ethylene 2,5-furandicarboxylate), poly(1,2-ethylene adipate-co-1,2-ethylene succinate-co-1,2-ethylene 2,5-furandicarboxylate), poly(1,2-ethylene azelate-co-1,2-ethylene succinate-co-1,2-ethylene 2,5-furandicarboxylate), their copolymers and mixtures.

As far as the polyamides in the compositions according to this invention are concerned, these are preferably selected from the group consisting of polyamides 6 and 6,6, polyamides 9 and 9,9, polyamides 10 and 10,10, polyamides 11 and 11,11, polyamides 12 and 12,12 and their combinations of the 6/9, 6/10, 6/11, 6/12 type, their mixtures and both random and block copolymers.

Preferably the polycarbonates in the compositions according to this invention are selected from the group consisting of polyalkylene carbonates, more preferably polyethylene carbonates, polypropylene carbonates, polybutylene carbonates, their mixtures and random and block copolymers.

Among the polyethers, those preferred are those selected from the group consisting of polyethylene glycols, polypropylene glycols, polybutylene glycols, their copolymers and mixtures having molecular weights from 70000 to 500000.

In addition to the components i.-iv. the compositions according to this invention preferably also comprise at least one other component selected from the group consisting of plasticisers, UV stabilisers, lubricants, nucleating agents, surfactants, antistatic agents, pigments, flame retardant agents, compatibilising agents, lignin, organic acids, antioxidants, anti-mould agents, waxes and process coadjuvants.

As far as plasticisers are concerned, in the compositions according to this invention there are preferably present, in addition to any plasticisers preferably used for preparation of the destructured starch and described above, one or more plasticisers selected from the group consisting of phthalates, such as for example diisononyl phthalate, trimellitates, such as for example esters of trimellitic acid with $C_4$-$C_{20}$ mono-alcohols preferably selected from the group consisting of n-octanol and n-decanol, and aliphatic esters having the following structure:

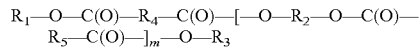

in which:
$R_1$ is selected from one or more groups comprising H, saturated and unsaturated linear and branched alkyl residues of the $C_1$-$C_{24}$ type, polyol residues esterified with $C_1$-$C_{24}$ monocarboxylic acids;
$R_2$ comprises —$CH_2$—$C(CH_3)_2$—$CH_2$— groups and $C_2$-$C_8$ alkylene groups, and comprises at least 50% in moles of the said —$CH_2$—$C(CH_3)_2$—$CH_2$— groups;
$R_3$ is selected from one or more of the groups comprising H, saturated and unsaturated linear and branched alkyl residues of the $C_1$-$C_{24}$ type, polyol residues esterified with $C_1$-$C_{24}$ monocarboxylic acids;
$R_4$ and $R_5$ are the same or different and comprise one or more $C_2$-$C_{22}$, preferably $C_2$-$C_{11}$, more preferably $C_4$-$C_9$, alkylenes and comprise at least 50% in moles of $C_7$ alkylenes,
m is a number of between 1 and 20, preferably 2-10, more preferably 3-7. Preferably in the said esters at least one of the $R_1$ and/or $R_3$ groups comprises polyol residues esterified with at least one $C_1$-$C_{24}$ monocarboxylic acid selected from the group consisting of stearic acid, palmitic acid, 9-ketostearic acid, 10-ketostearic acid and mixtures thereof, preferably in quantities ≥10% in moles, more preferably ≥20%, even more preferably ≥25% in moles with respect to the total quantity of $R_1$ and/or $R_3$ groups. Examples of aliphatic esters of this type are described in Italian patent application MI2014A000030 and in PCT applications PCT/EP2015/050336, PCT/EP2015/050338.

When present the selected plasticisers are preferably present up to 10% by weight with respect to the total weight of the composition.

Lubricants are preferably selected from esters and the metal salts of fatty acids such as for example zinc stearate, calcium stearate, aluminium stearate and acetyl stearate. Preferably the compositions according to this invention comprise up to 1% by weight of lubricants, more preferably up to 0.5% by weight, with respect to the total weight of the composition.

Examples of nucleating agents include the sodium salt of saccharin, calcium silicate, sodium benzoate, calcium titanate, boron nitride, isotactic polypropylene and low molecular weight PLA. These additives are preferably added in quantities up to 10% by weight and more preferably between 2 and 6% by weight with respect to the total weight of the composition. Pigments may also be added if necessary, for example titanium dioxide, clays, copper phthalocyanine, iron silicates, oxides and hydroxides, carbon black, and magnesium oxide. These additives are preferably added up to 10% by weight.

The process of producing the compositions according to this invention may take place according to any one of the processes known in the state of the art. Advantageously the compositions according to this invention are obtained through extrusion processes in which the polymer components are mixed in the molten state. When extruding the composition the components may be fed all together or one or more of them may be fed separately along the extruder.

The compositions according to this invention are extremely suitable in numerous practical applications for the manufacture of products such as for example films, fibres, nonwoven fabrics, sheets, moulded, thermoformed, blown or expanded articles and laminated articles including using the extrusion coating technique.

The compositions according to the present invention are biodegradable. In the meaning of this invention the compositions are meant biodegradable when characterized by a disintegration higher than 90% in 90 days according to standard ISO20200:2004.

Preferably, the compositions according to the present invention are biodegradable according to standard EN 13432.

The compositions according to the present invention are characterised by G' modulus values, obtained at 70° C. through dynamic mechanical-torsional analysis (DMTA), higher than 40 MPa, preferably higher than 50 MPa.

The compositions according to this invention are characterized by high barrier properties against oxygen, carbon dioxide and water vapour.

The compositions according to this invention have:
a permeability barrier against oxygen lower than 20 $(cm^3 \times mm)/(m^2 \times 24\ h \times bar)$ measured at 23° C.-50% relative humidity according to standard ASTM F2622-08, and
a permeability barrier against carbon dioxide lower than 45 $(cm^3 \times mm)/(m^2 \times 24\ h \times bar)$ measured at 23° C.-50% relative humidity according to standard ASTM F2476-05, and
a permeability barrier against water vapour transmission (WVTR) lower than 80 $(g \times 30\ \mu m)/(m^2 \times 24\ h)$ measured at 23° C.-50% gradient of relative humidity according to standard ASTM E96.

The Melt Volume-Flow Rate (MVR) of the compositions according to this invention is comprised between 1 and 40 $cm^3/10$ min, preferably 2 and 30 $cm^3/10$ min, measured at 190° C., 2.16 kg according to standard ISO 1133-1.

Preferably, the compositions according to the present invention are characterized by excellent mechanical properties, in particular high tensile strength, elongation and tensile modulus.

This invention also relates to articles comprising the composition according to this invention. Examples of products comprising the composition according to this invention are:
films, both mono- and bi-oriented, and multilayer film with other polymer materials;
film for use in the agricultural sector as film for mulching;
stretch film including cling film for foodstuffs, for bales in agriculture and for wrapping refuse;
bags and liners for organic collection such as the collection of food waste and grass cuttings;
thermoformed food packaging, both monolayer and multilayer, such as for example containers for milk, yoghurt, meat, beverages, etc.;
coatings obtained using the extrusion coating technique;
multilayer laminates with layers of paper, plastics, aluminium, metallised films;
expanded or expandable beads for the production of parts formed by sintering;
expanded and semi-expanded products including expanded blocks formed by pre-expanded particles;
expanded sheets, thermoformed expanded sheets, containers obtained from these for food packaging;
containers in general for fruit and vegetables;
composites with gelatinised, destructured and/or complexed starch, natural starch, flours, other fillers of natural plant or inorganic origin, as fillers;
fibres, microfibres, composite fibres with a core comprising rigid polymers such as PLA, PET, PTT, etc., and an outer shell in the material of the invention, deblens composite fibres, fibres having various cross-sections from round to multilobate, floc fibres, fabrics and nonwoven spun bonded or thermobonded fabrics for the sanitary, health, agriculture and clothing sectors.

It may also be used in applications as a replacement for plasticised PVC.

The compositions according to this invention are also particularly suitable for use in injection moulding and thermoforming, and spinning.

The characteristics of the compositions according to this invention in fact make it possible to manufacture injection moulded or thermoformed articles having a high heat deflection temperature (HDT) and high dimensional stability. For example the compositions according to this invention are particularly suitable for the production of disposable cutlery, plates and cups, rigid containers, capsules for the delivery of beverages, preferably hot beverages, caps and covers, and packaging for food which can be heated in conventional and microwave ovens.

In a preferred embodiment of this invention, the said thermoformed articles comprise at least one layer A comprising or consisting of a composition which comprises or consists of the polyester according to this invention and at least one layer B comprising at least one polymer selected from the group comprising diacid diol polyesters and hydroxy acid polyesters, and are preferably characterised by a mutual arrangement of the said layers A and B selected from A/B, A/B/A and B/A/B. In a further particularly preferred embodiment, said layer B comprises a lactic acid polyester.

As far as the process of moulding by thermoforming is concerned, the compositions according to this invention may be moulded in accordance with methods known to those skilled in the art, starting for example from sheets, slabs or film, under pressure or under vacuum. This invention also relates to the said sheets, slabs or films comprising the composition according to this invention used for the production of articles moulded by thermoforming.

Typical thermoforming operating conditions provide for example for a sheet, slab or film heating time of 5-8 seconds up to softening, and moulding times of between 15 and 20 seconds.

As far as injection moulding is concerned, the compositions according to this invention has the further advantage that they can be fed to conventional machinery without requiring substantial changes to normal working conditions, in comparison with other conventional polymers such as for example polyethylene, polypropylene, polystyrene and ABS. Preferably, in the case of objects having a maximum thickness of the order of 1 millimetre, these may be moulded using a melt temperature of 180-240° C., an oleodynamic pressure from 7 to 110 bar, a cooling time of 3 to 15 seconds and a cycle time of 10-30 seconds.

In a particularly preferred embodiment the injection moulded articles comprising the compositions according to this invention undergo hot annealing treatments at temperatures between 70 and 150° C. This invention also relates to articles obtained by means of annealing treatments (known as annealed products).

The said annealing treatments may advantageously be carried out in unconfined environments at constant temperature, for example within stoves. In this case the annealing treatments are preferably carried out at temperatures between 80 and 150° C. and with residence times of 30 sec-60 min, preferably 40 sec-30 min and even more preferably 40 sec-5 min, thus being particularly advantageous from the production point of view. The specific conditions which have to be used will vary depending upon the dimensions of the object which has to undergo annealing treatment and the level of heat resistance required by the application. In general in the case of thick objects it is preferable to use higher temperatures or longer residence times.

The said annealing treatments may also be carried out in confined environments, for example within preheated moulds at constant temperature, preferably from 80 to 100° C. for 1-5 minutes. The specific conditions which have to be used will vary depending upon the dimensions of the object undergoing annealing treatment. In general, in the case of thick objects it is preferable to use longer residence times.

The invention will now be illustrated through a number of embodiments which are intended to be by way of example and not to limit the scope of protection of this patent application.

EXAMPLES

The synthesis of Components i, ii-1, ii-3, ii-4 were carried out in a stainless steel batch one pot polymerization plant with a geometrical volume of 0.07 m3. The reactor is equipped with Nitrogen inlet, circulating oil heating system, stirring apparatus equipped with an electrical motor, distillation line with a column (structured packing), a condenser and a collecting vessel, vacuum line with a condenser, a cold trap and a vacuum rotary pump.

Component i: Poly(1,2-ethylene azelate-co-1,2-ethylene 2,5-furandicarboxylate)

12.3 Kg of 2,5-furandicarboxylic acid, 4.95 Kg of azelaic acid, 9.79 Kg of ethylene glycol, 58.1 g of glycerol, and 8 g of Tyzor®TE were fed into the reactor under nitrogen blanket then 3 vacuum/nitrogen cycles were applied in order to remove water and oxygen trace from the vessel. The temperature was raised up to 220° C. gradually and the reaction was carried on, in nitrogen flow, until the conversion reached the 140% (calculate as the ratio of amount of distillate and theoretical amount of stoichiometric water). After that a vacuum ramp to 200 mbar in about 30 minutes was applied in order to remove the large excess of ethylene glycol. The pressure was set to ambient pressure pumping nitrogen into the reactor and, after the addition of Tyzor®TnBT, the pressure was gradually reduced from atmospheric pressure to high vacuum (p<$^2$ mbar) in 45 minutes and the temperature was set to 238° C. Polymerization was carried on until the desired molecular weight was reached. The molecular weight was estimated by means of the torque measured at the stirring shaft. At the end of the polymerization stage the vacuum was neutralized pumping nitrogen into the vessel. The polymer was then discharged in strand, cooled in a cold water bath, pelletized by means of a pelletizing machine and dried.

Component ii-1: Poly(1,4-butylene succinate)

13.7 Kg of succinic acid, 12.0 Kg of 1,4-butanediol, 42.7 g of glycerol, and 2 g of Tyzor®TE were fed into the reactor under nitrogen blanket and the temperature was raised up to 230° C. gradually. The reaction was carried on, in nitrogen flow, until the conversion reached the 130% (calculate as the ratio of amount of distillate and theoretical amount of stoichiometric water). After the addition of 20 g of Tyzor®TnBT, the pressure was gradually reduced from atmospheric pressure to high vacuum (p<$^2$ mbar) in 45 minutes and the temperature was set to 235° C. Polymerization was carried on until the desired molecular weight was reached. The molecular weight was estimated by means of the torque measured at the stirring shaft. At the end of the polymerization stage the vacuum was neutralized pumping nitrogen into the vessel. The polymer was then discharged in strand, cooled in a cold water bath, pelletized by means of a pelletizing machine and dried.

Component ii-2: Polylactic acid Ingeo 3251D, MFR 35/10 min (@ 190° C., 2.16 kg).

Component ii-3: Poly(1,4-butylene adipate-co-1,4 butylene azelate-co-1,4-butylene terephthalate)

7.22 Kg of terephthalic acid, 5.01 Kg of adipic acid, 2.77 Kg of azelaic acid, 10.83 Kg of 1,4-butanediol, 4.26 g of glycerol, and 2 g of Tyzor®TE were fed into the reactor under nitrogen blanket and the temperature was raised up to 220° C. gradually. The reaction was carried on, in nitrogen flow, until the conversion reached the 120% (calculate as the ratio of amount of distillate and theoretical amount of stoichiometric water). After the addition of Tyzor®TnBT, the pressure was gradually reduced from atmospheric pressure to high vacuum (p<2 mbar) in 45 minutes and the temperature was set to 235° C. Polymerization was carried on until the desired molecular weight was reached. The molecular weight was estimated by means of the torque measured at the stirring shaft. At the end of the polymerization stage the vacuum was neutralized pumping nitrogen into the vessel. The polymer was then discharged in strand, cooled in a cold water bath, pelletized by means of a pelletizing machine and dried.

Component ii-4: Poly(1,2-ethylene sebacate)

17.7 Kg of sebacic acid, 6.25 Kg of ethylene glycol, 40.4 g of glycerol, and 2 g of Tyzor®TE were fed into the reactor under nitrogen blanket and the temperature was raised up to 220° C. gradually. The reaction was carried on, in nitrogen flow, until the conversion reached the 105% (calculate as the ratio of amount of distillate and theoretical amount of stoichiometric water). After the addition of Tyzor®TnBT, the pressure was gradually reduced from atmospheric pressure to high vacuum (p<2 mbar) in 45 minutes and the temperature was set to 235° C. Polymerization was carried on until the desired molecular weight was reached. The molecular weight was estimated by means of the torque measured at the stirring shaft. At the end of the polymerization stage the vacuum was neutralized pumping nitrogen into the vessel. The polymer was then discharged in strand, cooled in a cold water bath, pelletized by means of a pelletizing machine and dried.

Component iii: Micronised talc having a median diameter of 1 microns (particle size distribution by Sedigraph according to ISO 13317-3), Jetfine 3CA commercial grade from Imerys.

Component iv: fibrillar cellulose fibre having a mean fibre length of 550 microns L/D=18 Alpha-Cel C10 commercial grade from International Fiber Europe NV.

The compositions reported in Table 1 were fed respectively to an Icma San Giorgio MCM 25 HT model co-rotating twin screw extruder under the following operating conditions:

Screw diameter (D)=25 mm;
L/D=52;
Rotation speed=200 rpm;
Temperature profile=50-180-190×9-180-150×2° C.;
Throughput 10.1 kg/h.

TABLE 1

Compositions

| Example | Components (% wt) | | | | | | |
|---|---|---|---|---|---|---|---|
| | i | ii-1 | ii-2 | ii-3 | ii-4 | iii | iv |
| 1 | 45 | 44 | — | — | — | 11 | — |
| 2 | 40 | 40 | — | — | — | 10 | 10 |
| 3 | 35.4 | — | 34 | — | — | 30.6 | — |
| 4 | 35.4 | — | 44 | — | — | 20.6 | — |
| 5 | 31.4 | — | 43 | 15 | — | 10.6 | — |
| 6 | 36.4 | — | 38 | — | — | 25.6 | — |
| 7 | 34.6 | — | 36.2 | — | 4.8 | 24.4 | — |

The Melt Volume-Flow Rate (MVR) of the granules so obtained is measured at 190° C., 2.16 kg according to standard ISO 1133-1 (values in Table 2).

The barrier properties have been determined on films of 160-190 μm made with the compositions prepared according to Examples 1-7. Said films were subjected to annealing at temperatures between 60 and 120° C. and with residence times of between 0.5 and 5 minutes. The barrier properties (values in Table 2) have been determined by permeability measurements carried out in a Extrasolution Multiperm permeabilimeter at 23° C.-50% relative humidity, according to standard ASTM F2622-08 for oxygen and standard ASTM F2476-05 for carbon dioxide, and measured at 23° C.-50% gradient of relative humidity according to standard ASTM E96 for water vapour.

The granules so obtained were then injection moulded on an Engel victory 120 model press into a mould cavity having the geometry of a rectangular plate (width=70 mm, length=80 mm, thickness=1 mm), using the following operating conditions for injection moulding to:

Injection Temperature=200° C.
Oleodynamic pressure=70 bar
Mould filling time=0.6 s
Holding Pressure=500 bar
Holding time=2 s
Cooling time=6 s
Cycle time=12 s
Screw rotation speed (RPM)=90.

From these rectangular plates, bars (length 30 mm, width 6 mm, thickness 1 mm) were obtained, which then underwent dynamic mechanical-torsional analysis (DMTA) in torsional mode using an Ares G2 rotational rheometer from TA Instrument. The samples were heated from 25° C. to 120° C. at 3° C./min imposing a deformation of 0.1% and a frequency of 1 Hz. The compositions were characterized at 70° C. by G' values shown in the Table 2 below.

TABLE 2

Characterization

| Example | MVR (cm³/10 min) | P(O$_2$) $\left[\dfrac{cm^3 \times mm}{m^2 \times 24\,h \times bar}\right]$ | P(CO$_2$) $\left[\dfrac{cm^3 \times mm}{m^2 \times 24\,h \times bar}\right]$ | WVTR $\left[\dfrac{g \times 30\,\mu m}{m^2 \times 24\,h}\right]$ | G' (MPa) |
|---|---|---|---|---|---|
| 1 | 9.2 | 4.8 | 23.4 | 34 | 52 |
| 2 | 8.6 | 13.1 | 24.5 | 73 | 67 |
| 3 | 16.1 | 2.9 | 12.6 | 21 | 118 |
| 4 | 9.1 | 3.5 | 14.5 | 31 | 143 |
| 5 | 11.9 | 9.1 | 35.9 | 34 | 113 |
| 6 | 7.7 | 3.2 | 13.5 | 12 | 160 |
| 7 | 8.9 | 5.0 | 20.2 | 10 | 168 |

Disintegration tests were performed on specimens of length 25 mm, width 25 mm, thickness 0.6 mm in controlled composting conditions according to standard ISO20200:2004 "Plastics—Determination of the degree of disintegration of plastic materials under simulated composting conditions in a laboratory-scale test" at 58° C. All the compositions according to Examples 1-7 show a disintegration weight loss higher than 90% in 90 days.

The invention claimed is:

1. A biodegradable composition comprising, with respect to the sum of components i.-iv.:
   i. 20-60% by weight of at least one biodegradable polyester;
   ii. 20-70% by weight of at least one biodegradable polymer which is not the polyester, selected from the group consisting of polyhydroxyalkanoates and/or aliphatic and/or aliphatic-aromatic diacid diol polyesters which are not polyester i., and mixtures thereof;
   iii. 0-50% by weight of at least one filler;
   iv. 0-30% by weight of plant fibres;
   wherein the biodegradable polyester i. comprises:
   a) a dicarboxylic component comprising, with respect to the total dicarboxylic component:
      a1) 85-65% in moles of units deriving from 2,5-furandicarboxylic acid or an ester thereof;
      a2) 15-35% in moles of units deriving from at least one saturated dicarboxylic acid selected from the group consisting of adipic acid, azelaic acid, succinic acid, sebacic acid, brassylic acid or an ester or derivative thereof;
      a3) 0-15% in moles of units deriving from at least one aliphatic saturated dicarboxylic acid which is not the saturated dicarboxylic acid in component a2, or esters thereof,
      a4) 0-5% in moles of units deriving from at least one unsaturated aliphatic dicarboxylic acid or an ester thereof;
   b) a diol component comprising, with respect to the total diol component:
      b1) 95-100% in moles, of units deriving from 1,2-ethanediol;
      b2) 0-5% in moles of units deriving from at least one saturated aliphatic diol which is not 1,2-ethanediol;
      b3) 0-5% in moles of units deriving from at least one unsaturated aliphatic diol.

2. The biodegradable composition according to claim 1 comprising, with respect to the sum of components i.-iv.:
   i. 20-60% by weight of at least one biodegradable polyester i.;
   ii. 20-70% by weight of at least one polyhydroxyalkanoate;
   iii. 0-50% by weight of at least one filler;
   iv. 0-30% by weight of plant fibres.

3. The biodegradable composition according to claim 1 comprising, with respect to the sum of components i.-iv.:
   i. 20-60% by weight of at least one biodegradable polyester i.;
   ii. 20-70% by weight of at least one aliphatic diacid diol polyester;
   iii. 0-50% by weight of at least one filler;
   iv. 0-30% by weight of plant fibres.

4. The biodegradable composition according to claim 1 comprising, with respect to the sum of components i.-iv.:
   i. 20-60% by weight of at least one biodegradable polyester i.;
   ii. 20-70% by weight of at least one aliphatic-aromatic diacid diol polyester;
   iii. 0-50% by weight of at least one filler;
   iv. 0-30% by weight of plant fibres.

5. The biodegradable composition according to claim 1, characterized by a permeability barrier against oxygen lower than 20 (cm3×mm)/(m2×24 h×bar) measured at 23° C. 50% relative humidity according to standard ASTM F2622-08.

6. The biodegradable composition according to claim 1, characterized by a permeability barrier against carbon dioxide lower than 45 (cm3×mm)/(m2×24 h×bar) measured at 23° C. 50% relative humidity according to standard ASTM F2476-05.

7. The biodegradable composition according to claim 1, characterized by a permeability barrier against water vapour transmission lower than 80 (g×30 µm)/(m2×24 h) measured at 23° C.-50% gradient of relative humidity according to standard ASTM E96.

8. The biodegradable composition according to claim 1, characterised by G' modulus values higher than 40 MPa, obtained at 70° C. through dynamic mechanical-torsional analysis.

9. A film, nonwoven fabric, sheet, moulded, thermoformed, blow moulded expanded or laminated article comprising the composition according to claim 1.

10. An injection moulded article comprising the composition according to claim 1.

11. The injection moulded article according to claim 10 suitable for the production of disposable cutlery, plates and cups, rigid containers, capsules for the delivery of beverages, caps and covers, and packaging for food which can be heated in conventional and microwave ovens.

12. The biodegradable composition according to claim 2, characterized by a permeability barrier against oxygen lower than 20 (cm3×mm)/(m2×24 h×bar) measured at 23° C.-50% relative humidity according to standard ASTM F2622-08.

13. The biodegradable composition according to claim 3, characterized by a permeability barrier against oxygen lower than 20 (cm3×mm)/(m2×24 h×bar) measured at 23° C.-50% relative humidity according to standard ASTM F2622-08.

14. The biodegradable composition according to claim 4, characterized by a permeability barrier against oxygen lower than 20 (cm3×mm)/(m2×24 h×bar) measured at 23° C.-50% relative humidity according to standard ASTM F2622-08.

15. The biodegradable composition according to claim 2, characterized by a permeability barrier against carbon dioxide lower than 45 (cm3×mm)/(m2×24 h×bar) measured at 23° C.-50% relative humidity according to standard ASTM F2476-05.

16. The biodegradable composition according to claim 3, characterized by a permeability barrier against carbon dioxide lower than 45 (cm3×mm)/(m2×24 h×bar) measured at 23° C.-50% relative humidity according to standard ASTM F2476-05.

17. The biodegradable composition according to claim 4, characterized by a permeability barrier against carbon dioxide lower than 45 (cm3×mm)/(m2×24 h×bar) measured at 23° C.-50% relative humidity according to standard ASTM F2476-05.

18. The biodegradable composition according to claim 2, characterized by a permeability barrier against water vapour transmission lower than 80 (g×30 µm)/(m2×24 h) measured at 23° C.-50% gradient of relative humidity according to standard ASTM E96.

19. The biodegradable composition according to claim 3, characterized by a permeability barrier against water vapour transmission lower than 80 (g×30 µm)/(m2×24 h) measured at 23° C.-50% gradient of relative humidity according to standard ASTM E96.

20. The biodegradable composition according to claim 4, characterized by a permeability barrier against water vapour transmission lower than 80 (g×30 µm)/(m2×24 h) measured at 23° C.-50% gradient of relative humidity according to standard ASTM E96.

21. The biodegradable composition according to claim 1, wherein the polyester i) has a molecular weight Mn≥20000.

* * * * *